United States Patent [19]

Brumage

[11] Patent Number: 4,709,263
[45] Date of Patent: Nov. 24, 1987

[54] STEREOSCOPIC IMAGING APPARATUS AND METHODS

[76] Inventor: John Brumage, 185 N. Clinton Ave., Lindenhurst, N.Y. 11757

[21] Appl. No.: 823,263

[22] Filed: Jan. 28, 1986

[51] Int. Cl.$^4$ ............................................. H04N 13/00
[52] U.S. Cl. ......................................... 358/88; 358/3; 358/89; 350/131; 350/133; 350/143
[58] Field of Search .................. 358/3, 88, 89, 91, 92; 350/130, 131, 133, 134, 137, 138, 139, 142, 143, 144; 352/60, 62; 354/112, 113, 114

[56] References Cited

U.S. PATENT DOCUMENTS

| | | | |
|---|---|---|---|
| 1,520,311 | 11/1923 | Ruth | 350/143 |
| 2,571,612 | 10/1951 | Rines . | |
| 2,729,138 | 1/1956 | Bernier | 88/16.6 |
| 4,406,532 | 9/1983 | Howlett | 354/114 |
| 4,429,951 | 2/1984 | Hirano | 350/144 |
| 4,523,226 | 6/1985 | Lipton et al. | 358/88 |
| 4,559,556 | 12/1985 | Wilkens | 358/88 |
| 4,597,634 | 6/1986 | Steenblik | 350/131 |

FOREIGN PATENT DOCUMENTS

| | | | |
|---|---|---|---|
| 0042228 | 4/1981 | Japan | 358/89 |
| 0184118 | 10/1983 | Japan | 350/132 |

OTHER PUBLICATIONS

Foundations of the Stereo-Scopic Cinema—A Study in Depth; by Lenny Lipton; Van Nostrand Reinhold Company Inc.; 1982.

Primary Examiner—James J. Groody
Assistant Examiner—Michael D. Parker
Attorney, Agent, or Firm—Stanley Ira Laughlin

[57] ABSTRACT

A stereoscopic process for providing three dimensional viewing through a conventional television comprising the steps of receiving video signals having chromatic aberration, modifying said video signals into stereo images for any scope aspect, recording said modified stereo images on a video media, transmitting said modified recorded stereo image pairs to a conventional television and independently viewing said stereo images with depth perception through adjustable eyeglasses having chromatic aberration complementary to the recorded chromatic aberration.

26 Claims, 20 Drawing Figures

STEREOSCOPIC IMAGING APPARATUS AND METHODS

BACKGROUND OF THE INVENTION

This invention relates in general to stereoscopic apparatus and systems such as taught in class 40 Subclass 158, and in particular to stereoscopic apparatus and processes for three dimensional imaging such as described in Class 350, Subclasses 130, 133, and 396; Class 352 Subclasses 57 et seq.; Class 353 Subclass 7; Class 354 Subclasses 112 et seq; and Class 358 Subclasses 88 et seq.

Stereoscopic apparatus and processes have been known since the middle of the nineteenth century when Sir Charles Wheatstone introduced his stereoscopic viewer in 1838. Evidence that these devices have been taken out of the class of entertaining parlor devices and are employed for more important applications is shown by the following references:

| U.S. Pat. No. | Patentee |
| --- | --- |
| 666,424 | F. E. Ives |
| 725,567 | F. E. Ives |
| 1260682 | C. W. Kanolt |
| 2139855 | St. Genies De Lassus |
| 2571612 | R. H. Rines |
| 2729138 | R. V. Bernier |
| 3503315 | R. L. DeMontebello |
| 3990087 | A. M. Marks et al |
| 4406532 | E. M. Howlett |
| 4523226 | L. Lipton et al |

Only U.S. Pat. No. 2,571,612 to Rines, U.S. Pat. No. 2,729,188 to Bernier, U.S. Pat. No. 4,406,532 to Howlett and U.S. Pat. No. 4,523,226 to Lipton el al have any relevance to the present invention. Bernier teaches a split over/under format on projection film. Rines teaches the use of polarization to assist the eyes to separately view the stereo images in sequence. Howlett teaches pre-chroma differences relating to the color aberration of simple convex lenses. Lipton teaches a format on the Cathode Ray Tube employing central blanking and anamorphical compession techniques. In addition to the foregoing, the following publications provide excellent background material for this invention:

Three-Dimensional Imaging Techniques by Takanori Okoshi, Academic Press, 1985.

Foundations of the Stereo-Scopic Cinema—A Study in Depth by Lenny Lipton, Van Nostrand Reinhold Company Inc., 1982.

It is an object of this invention to provide simple, economical and safe processes and apparatus for the production and viewing of stereo pairs by any known visual process including, but not limited to printing, motion pictures, television, video tape, video disc, painting, drawing, still photography and computer graphics.

It is an object of this invention to provide a system for three dimensional viewing of pairs of two-dimensional still or moving photographs, printed images and television signals utilizing present day technology.

It is also an object of this invention to allow for the viewer to be located anywhere in the viewing area with freedom of head movement and position and to provide means for adjusting the optical elements accurately without causing muscle movement by the viewer's eyes thereby overcoming false sensory perception errors caused by the visual muscle mechanism of the brain.

It is a further object of this invention to compenstate for chromatic aberration caused by prismatic viewers.

It is a further object of this invention to provide uniform altered aspect ratios by present day transmission systems.

It is a further object of this invention to allow for better system physiological and phychological comfort and improved enjoyment in viewing three dimensional images.

It is yet another object of the invention to provide means for the accurate placement on image pairs in relationship to each other when preparing and viewing stereoscopic image pairs.

SUMMARY OF THE INVENTION

The invention relates to the apparatus and process of providing Three-Dimensional images from pairs of two dimensional images for manufacturing video tapes, printed material, photographs and motion pictures for the recording and viewing of stereo images without central blanking by employing techniques for modifying said stereo images for any scope aspect, by employing techniques for adjusting critical distance relationships between said stereo pairs and by employing chromatic aberration misregistration techniques wherein adjustable glasses are employed for viewing stereo image pairs in any visual medium comprising complementary pre-correction of chromatic aberration.

DESCRIPTION OF THE DRAWINGS

The invention will be described in conjunction with the following drawings.

DETAILED DESCRIPTION

Applicant's stereoscopic Third-Dimensional imaging system is an improvement over the prior art devices taught by Lipton et al by the improved process and apparatus employing techniques requiring no waste blanking areas between stereo images as more clearly described in the following paragraphs.

Figure 1:
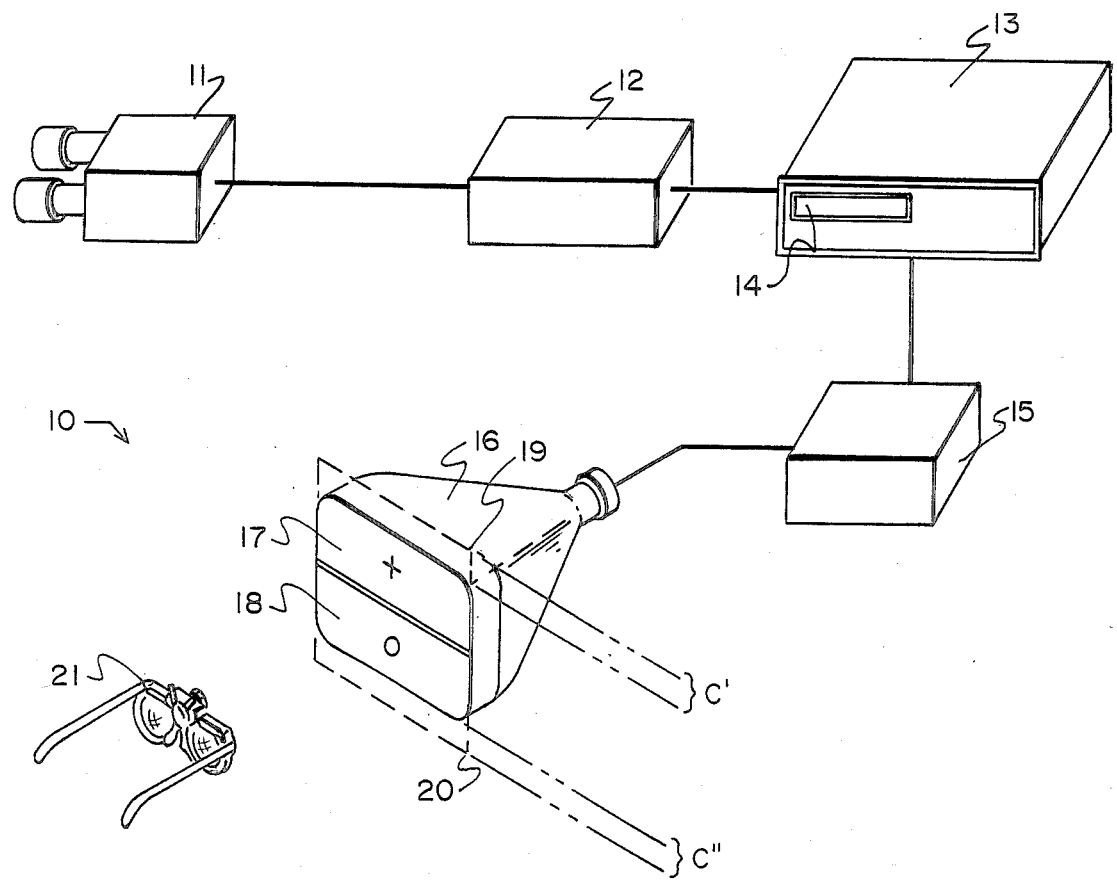
FIG. 1 shows a combination isometric and block diagram of Applicant's inventive system.
Figure 2:
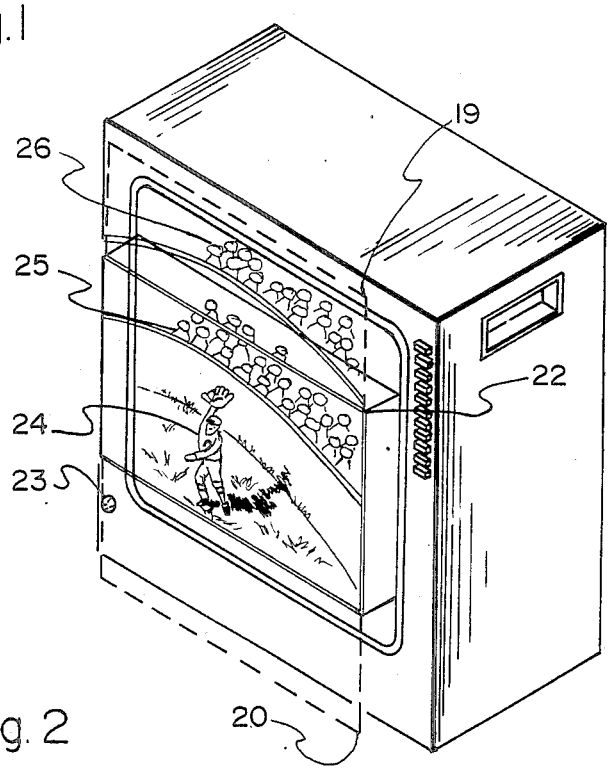
FIG. 2 shows an isometric view of a Three-Dimension Television comprising the Cathode Ray Tube shown in FIG. 1 as finally observed by the viewer.
Figure 15:
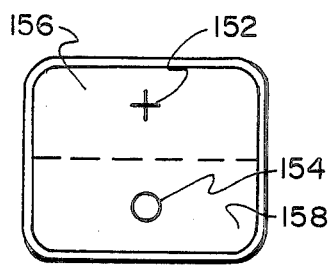
FIG. 15 is a front view of test patterns for the stereo image pairs observed by the viewer before properly adjusting the eyeglasses.
Figure 16:
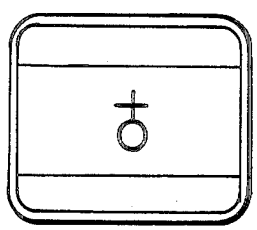
FIG. 16 is a front view of test patterns observed by the viewer after properly partially adjusting the eyeglasses.
Figure 17:
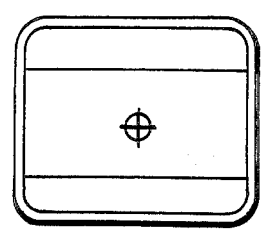
FIG. 17 is a front view of test patterns observed by the viewer after properly adjusting the eyeglasses.

FIG. 1 shows the optimum embodiment of applicant's stereoscopic color imaging system 10 comprising a video stereo camera 11, which is connected to a chroma correcting delay device 12 which is connected to an conventional video cassette recorder 13, which in turn is connected to an electronic marking device 15, which in turn is connected to a conventional television having a cathode ray tube (CRT) 16. An ordinary video tape (not shown) is employed for recording and playing left and right stereo image subfields 17, 18 received from the video camera 11. Part of subfield 17 designated by upper section C' is incomplete; being off the upper section of CRT 16 and bounded at its upper perimeter by dashed line 19. Part of subfield 18 designated by lower section C" is also incomplete; being off the lower section of CRT 16 and bounded at its lower perimeter by dashed line 20. The image subfield 17 as seen by the left eye is on top and the image subfield 18 as seen by the right eye is on the bottom, although there is no reason why the positions could not be reversed. Adjustable eyeglasses having left and right eye pairs of optical devices such as prisms deflect the left eye's view of image subfield 17 downward and the right eye's view of image subfield 18 upward so that a third image which is the superposition of the first and second image subfields appears, as shown in FIG. 2. The superimposed third image does in fact have the perception of depth resulting in a three-dimensional image such as illustrated in FIG. 2 by the baseball 23 appearing in front of the CRT 16 and the baseball player 24, appearing in front of the fans 25 nearby which are in front of the fans 26 in the bleachers. Individual adjustment of the eyeglasses, as will be more clearly pointed out in the following paragraphs, converge the left and right eye's subfields 17 and 18, resulting in a three-dimensional image. Convergence adjustment test patterns, which will be more clearly pointed out in the following paragraphs and FIGS. 15, 16, and 17, are shown displayed on the CRT 16 in subfields 17 and 18 of FIG. 1.

When stereo pairs of pictures are viewed by a prismatic system, color corrected prisms must be employed or else color fringes will appear on images. In order to provide for adjustability as well as decreased manufacturing costs, employment of non-color corrected prisms having only flat optical surfaces are desirable. In applicant's system color registration of the red and blue components of the image are repositioned by electronic storage of the red, green, blue video components, or by misregistration by optic or mechanical means. During preparation, color misregistration complimentary to the color aberration of the viewing prisms is introduced into the images and when the misregistrated images are viewed using the prisms described in the preceding and following paragraphs, the color aberration of the prism re-registers the colors of the images. All of the prior art devices with the exception of Howlett either ignore color aberration or attempt to eliminate it at any expense. Applicant's inventive apparatus and process is an improvement of prior art systems by compensating said aberrations to improve the image.

Figure 3:
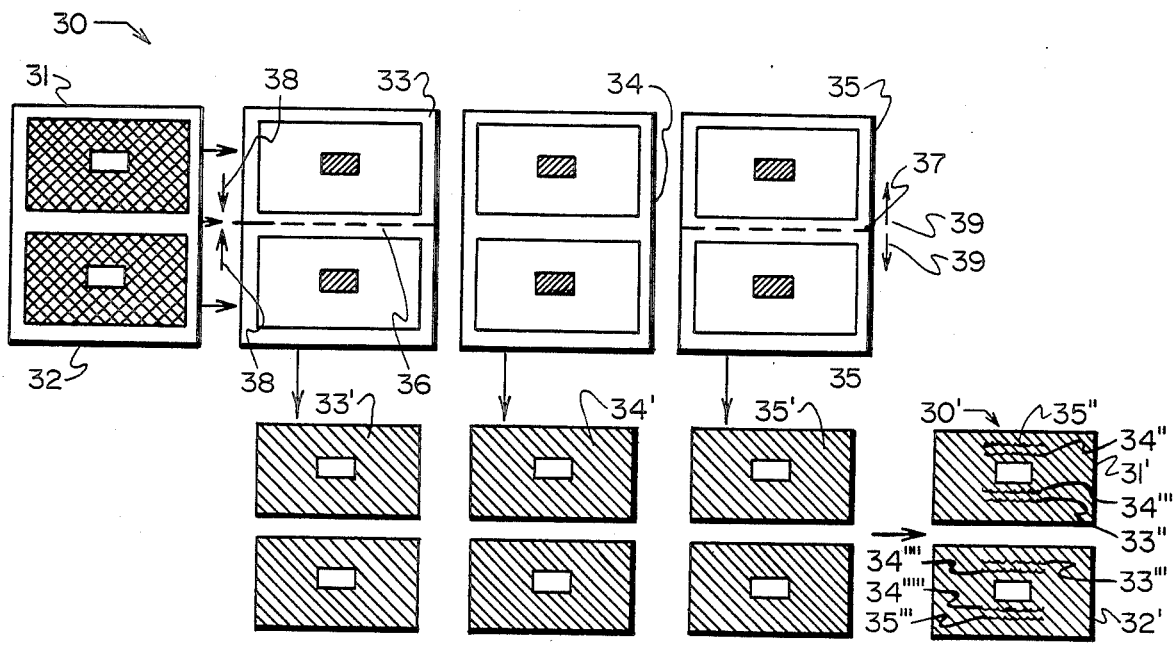
FIG. 3 shows mechanical means for correcting chromatic aberration such as employed in the preparation of printing plates for offset or other printing processes.

In Applicant's system, one method of chromatic aberration or chroma compensation may be through mechanical means, such as would be employed in the preparation of printing plates for offset or other printing processes. The original art 30, illustrated in FIG. 3 as a white rectangle on a black background for left subimage 31 and right subimage 32 comprising a stereo image pair are successively photographed on to high contrast negative material for a three color separation process through red, green and blue filters to result in a red negative 33, gren negative 34, and blue negative 35. Should a four color process be employed, only an additional negative is required to be photographed through a yellow filter. The stereo image pairs are then conventionally mounted in flats, the red negatives being cut along dashed line 36 and the blue negatives being cut along dashed lines 37. The red negatives are repositioned by moving the image pairs towards each other, as indicated by arrows 38, and printed to produce plates for stereo image pair 33'. The blue negatives are repositioned by moving the image pairs away from each other, as indicated by arrows 39, and printed to produce plates for stereo image pair 35'. The green negatives are printed without modification to produce plates for stereo image pair 34'. The printed stereo image pair 30' will have the chromatic aberration as shown comprising blue fringe 35", cyan fringe 34", yellow fringe 34'" and red fringe 3" in upper subimage 31' and red fringe 33'", yellow fringe 34"", cyan fringe 34""' and blue fringe 35'" in the lower subimage 32'. When the stereo image pair is viewed through non-color corrected adjustable optical devices as hereafter described, the color fringes introduced as described above will be cancelled by the chromatic aberration of the optical devices.

Another method of chromatic aberration compensation may be implemented by complementary optical means (not shown) placed before right and left stereo camera viewing lenses, such as nonchroma corrected prisms having chromatic aberration equal and complementary to the viewing devices resulting in perceived images from the video camera without chroma fringes.

Figure 4:
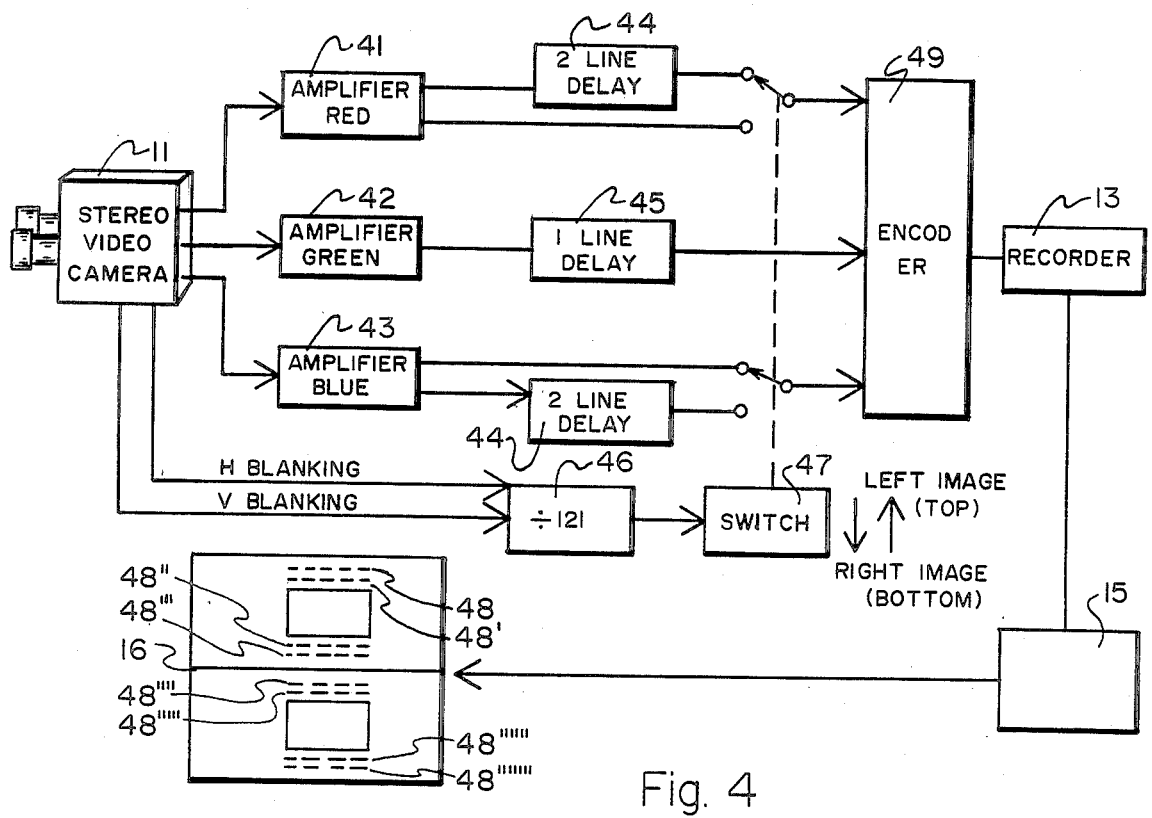
FIG. 4 is a electrical block diagram showing electronic means for introducing controlled chromatic aberration for correcting the chromatic aberration of the optical elements used for viewing.

FIG. 4 describes electronic means for correcting, or more particularly compensating chromatic aberration in Applicant's system. The output signals from stereo video camera 11 comprising red, green and blue components are applied to amplifiers 41, 42, and 43 respectively. Dual outputs of each of the amplifiers 41 and 43 having had one component from each amplifier passed through a two scan line delay device which is then passed through a switching relay 47 with the other component for producing left and right subimages. Switching relay 47 being controlled by blanking signals from the video camera 11 which has passed through a 121 scan line counter 46. Prior to the beginning of the first scan, counter 46 has been reset by the vertical blanking pulse and thereby has reset switch 47 to the upper position as shown in FIG. 4. Therefore only a single component output from amplifier 42 is passed through a one scan line delay device 45 without passing through switching relay 47.

The operation of the circuit shown in FIG. 4 to compensate chromatic aberration will be described with the video camera scanning a white rectangle within a dark background. When the video camera first scans the white rectangle of the upper subfield, amplifiers 41, 42, and 43 will produce equal positive input pulses but the switching relay 47 will not pass the two scan line delayed red component for the upper subfield (left eye), only the undelayed blue component for the upper subfield (left eye). The green component, not passing through switching relay 47 will always have a one scan line delay. Therefore the resulting signal at the encoder and ultimately at the CRT 16 will be a blue fringe 48. When the scanning circuits of video camera 11 scan the white rectangle of the upper subimage for the second time, the switching relay 47 remains unchanged, the undelayed blue component will again register a positive pulse at encoder 49, but this time the green signal, having been delayed from the previous scan will also register a positive pulse at encoder 49 resulting in a cyan fringe 48' at the CRT. When the scanning circuits scans the white rectangle for the third time, the switching relay 47 still remains unchanged, the undelayed blue signal will again register a positive pulse as will the green signal from the previous scan, but this time the red signal from the first scan, having been delayed for two scan lines, will also register a positive pulse at encoder 49 resulting in the white rectangle being displayed at the CRT. The circuit will produce the white rectangle in the same manner until the scanning circuit of the video camera scans the dark or black background below the white rectangle of the upper subimage for the first time. Then, the switching relay 47 remaining unchanged, the blue signal will not produce a positive pulse at encoder 49. However the red and green components will produce positive pulses at encoder 49 resulting in a yellow fringe 48" at CRT 16. When the scanning circuits of video camera 11 scans the black background below the white rectangle of the upper subimage for the second time, only the two scan line delayed red signal will register a positive pulse at encoder 49; there being no green signal from a previous scan. The red signal will result in a red fringe 48''' at CRT 16. After 121 scans, divider 46 will actuate switching relay 47 resulting in the delay times for the red and blue signals being interchanged. The lower subimage scanning operation will be similar to that of the upper subimage resulting in the lower subimage of a red fringe 48'''' at the first scan of the white rectangle in the lower subimage, and a yellow fringe 48''''' when the video camera 11 scans the white rectangle in the lower subimage for the second time. Likewise, a cyan fringe 48'''''' results when the video camera first scans the black background below the white rectangle and a blue fringe 48''''''' when the video camera scans the black background below the white rectangle in the lower subimage for the second time. In the foregoing description, it is noted that that delay times may be altered to compensate for the chromatic aberration of specific prism designs.

The invention distinguishes over the prior art of Rines and Bernier whose prior work in over/under formats and polarization in the cinetography field is well known. To understand applicant's application better, consider cutting an original stereo photograph having an aspect ratio of 1:85:1 and then taping the two images to a mounting sheet vertically aligned. The over/under pair of the modified original stereo image photograph is recorded on a video cassette with a video camera. Of course, modern technology in the television field would permit this "cutting and paste" process known commercially as "pan and scan" to be done electronically as commonly used in televsion broadcasting with 4:3 aspect ratio using a monocular 1.85:1 motion picture. However, in order to better appreciate and understand some of the fundamentals of applicant's inventive methods, the following paragraphs will discuss only the mechanical "cut and paste" modification of the original stereo photograph to more clearly point out applicant's invention.

Figure 5:
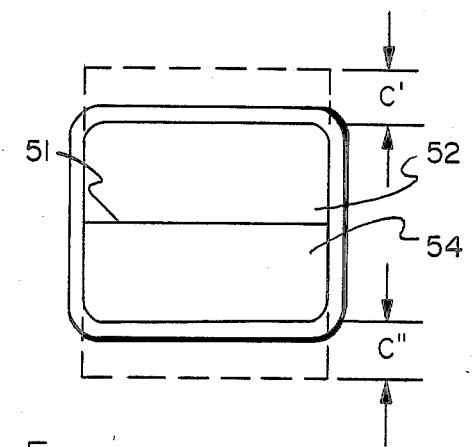
FIG. 5 is a front view of a Cathode Ray Tube for describing one method of the preparation of video tapes for the inventive process.

FIG. 5 depicts the front of the cathode ray tube 51 on the television set when there is a very small cutoff image C', C" due to the tube's overscan showned by the dashed lines. The aspect ratio of this method is 2.66:1 and the upper left eye portion 52 of the original cut stereo photograph is on top of the lower right eye portion 54 of the same cut stereo photograph. The stereo images are without blanking between the upper image 52 and the lower image 54, and with missing information C', C" reconstructed in the brain of the person viewing. The amount of the missing display information varies according to the specific television device, but is about 10% of the image height.

Figure 6:
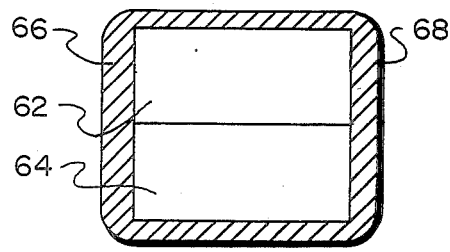
FIG. 6 is a front view of a cathode ray tube for describing another method of the preparation of video tapes for the inventive process.

Another method of preparing video tape cassettes for stereoscopic imaging provides for the left and right image each having a 1.85:1 aspect ratio as shown in FIG. 6. The two images 62 and 64 respectively abut without blanking between the upper and lower images although there is substantial blanking on the sides 66 and 68 due to increased horizontal blanking to preserve the original aspect ratio. It is noted that there is increased vertical blanking to compensate for the overscan in conventional television receivers. Missing information C', C" does not exist in this method. It is also noted that this method is wasteful of transmission bandwidth, and that the first method which incorporates the incomplete images or missing information C', C" results in a larger perceived image with a taller aspect image.

Figure 7:
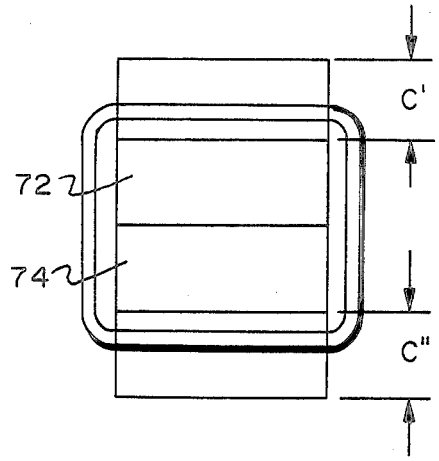
FIG. 7 is a front view of a cathode ray tube for describing yet another method of the preparation of video tapes for the inventive process.

A third method wherein the 1:85:1 scope aspect images were kept the same, but the video cameras employed for recording the stereo photograph was moved closer so that the blanking was eliminated at the sides. This resulted in a wider image as shown in FIG. 7 but the top of the left image 72 and the bottom of the right image 74 were cropped resulting in larger incomplete images or missing information C', C". The incomplete image perceived by the left eye contained information missing from the incomplete image perceived by the right eye and vice versa so that the brain sees" a complete image. Although use of the unique method of employing incomplete images C', C" is the least wasteful of transmission bandwidth, it results in values exceeding 15% of image height for the incomplete images causing eye fatigue in its use and therefore is reserved for special applications such as may be required for special effects.

Although applicant's embodiments were simply described by a mechanical cut and past method, it is noted that present high technology techniques are well known and in daily use by television broadcasters.

As stated in the foregoing paragraphs, viewing glasses or prisms are required for the depth aspect of the image being viewed. Adjustable means in which each pair of the viewing glasses or prisms contain four identical or substantially similar optical means, such as lenses or prisms. Provision is made for holding two lenses or prisms in front of each eye and are such that the left and right lenses or prisms can rotate in the same direction and with equal amounts of rotation at 180 degree displacement from each other and that the front and rear lenses or prisms can rotate either in the same direction or in opposite directions by equal amounts.

Figures 9A, 9B:
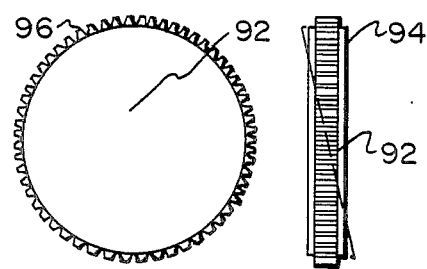
FIGS. 9a and 9b are front and side elevation views respectively of one of the adjustable optical devices incorporated in the adjustable eyeglasses shown in FIG. 8.
Figure 10:
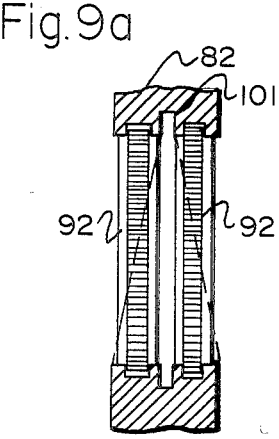
FIG. 10 shows the cross sectional view along lines aa in FIG. 8 of the front and rear optical devices for the right eye mounted in the frame of the adjustable eyeglasses.
Figure 11:
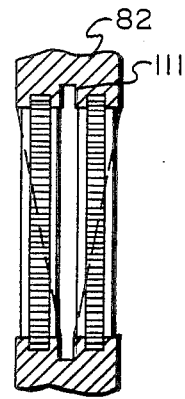
FIG. 11 shows the cross sectional view along lines bb in FIG. 8 of the front and rear optical devices for the left eye mounted in the frame of the adjustable glasses.
Figure 8:
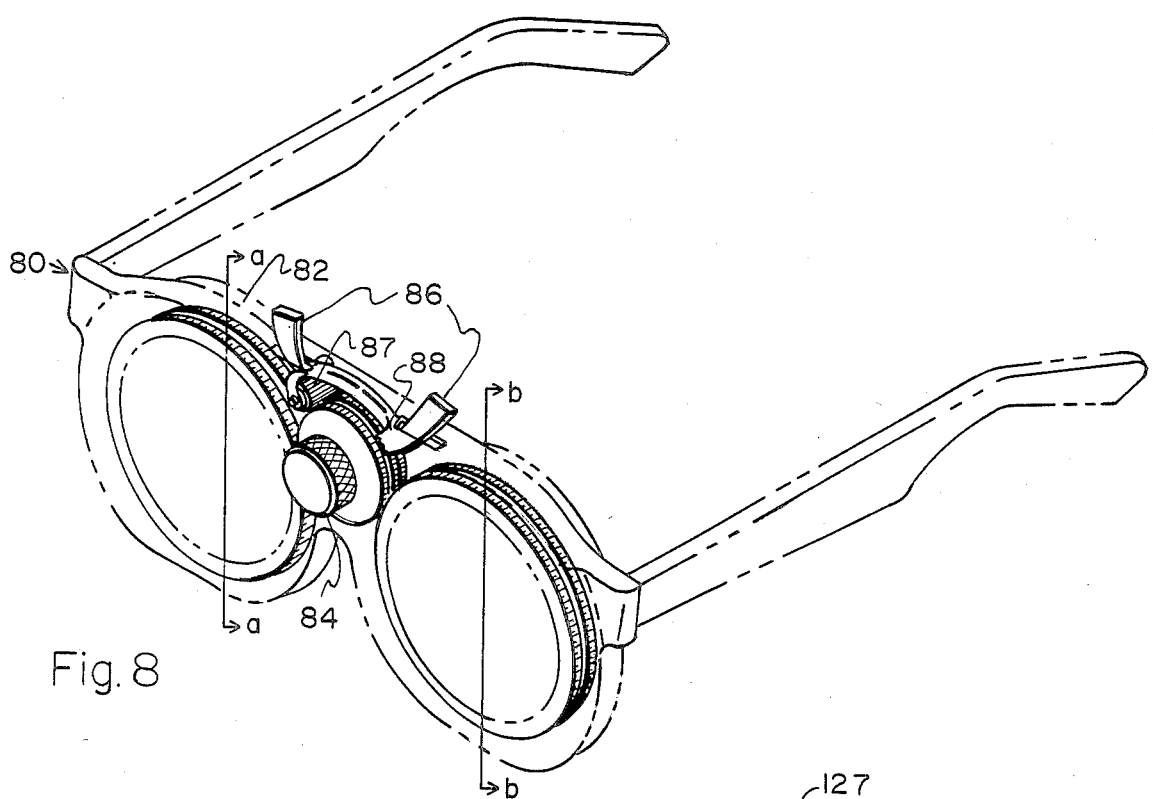
FIG. 8 is a isometric view of the adjustable eyeglasses for three-dimensional viewing.
Figure 12:
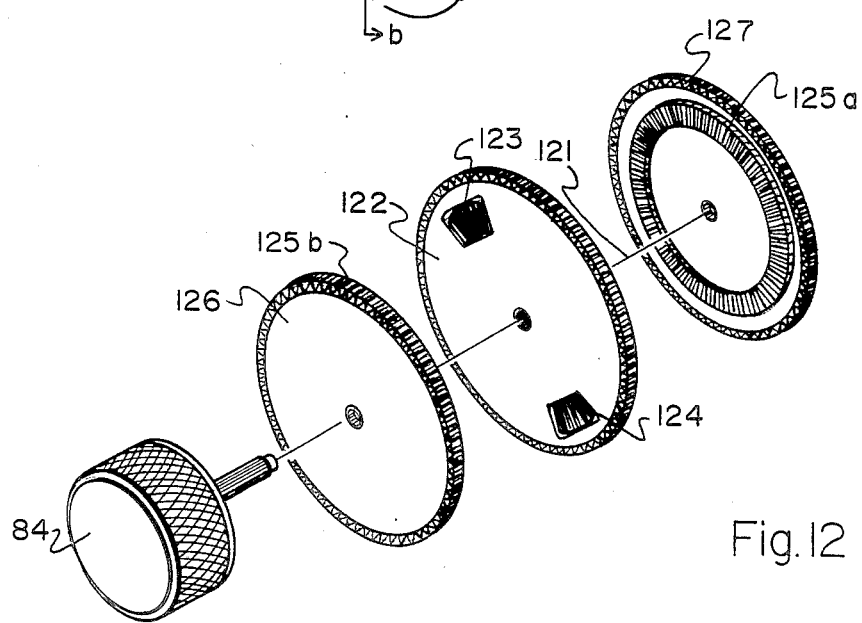
FIG. 12 is an isometric view of one embodiment for the operating mechanism for adjusting the optical devices shown in FIGS. 9a, 9b, 10, and 11.
Figure 13:
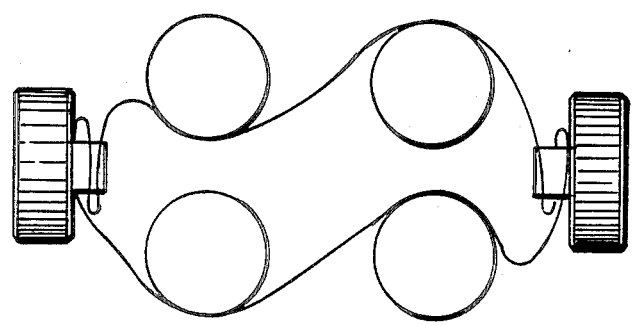
FIG. 13 is an operating diagram of another operating embodiment for adjusting the optical devices shown in FIGS. 9, 10, and 11.
Figure 14:
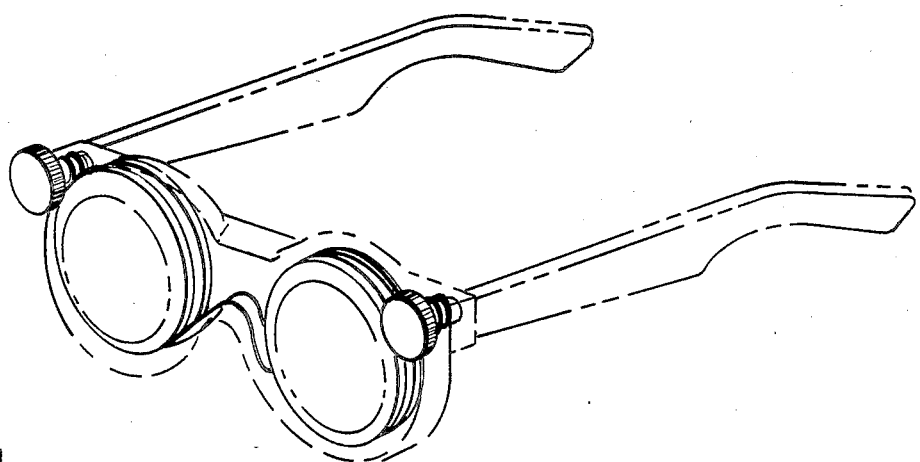
FIG. 14 is an isometric view of the embodiment shown in Figure 13 employing the means for adjusting the optical devices shown in FIGS. 9a, 9b, 10 and 11.

Eyeglasses 80 as shown in FIG. 8 comprise frames 82 wherein two pairs of prisms, as shown in more detail in FIGS. 9a, 9b, 10, and 11 are mounted for adjustment. Front and side elevation views of one embodiment of the single prism mounted in the adjustable viewing glasses 80 is shown in FIGS. 9a and 9b where a prism 92 is positioned within a cylinder 94 having gear teeth 96 upon its outer periphery. Although this structure shows separate prism and gearing, other optical material having gear teeth machined or formed or otherwise incorporated on the optical material itself can be employed. Any mechanical means, such as shown in Figures 12, 13 and 14, for driving the gearing 96, will provide the requisite vertical and horizontal adjustments required for optimum individual viewing. FIGS. 10 and 11 illustrate the front and rear positions of the prisms for the right eye and the left eye respectively. Although slots 101 and 111 may be provided in the frames for occluders and septems, such opague shutters restrict head movements. A polarizing shutter or even a full polarizer requiring attachment of polarizing sheets can be employed but will result in some light loss. Images can be comfortably viewed without either of these auxiliary devices.

As previously stated, each pair of glasses contain prisms or lenses. The prisms or lenses either have been machined or formed into the optical material or the mounting comprising separate geared rings, to which the prism or lens may be attached. The eyeglass frame itself may contain devices which mate with the mounting grooves for the prisms or lenses. As clearly shown in FIGS. 8, 10 and 11 there are two prisms in front of each eye and gearing is provided for the prisms or lenses which rotate with the gears. The gearing provided is such that the left and right prisms of the eyeglasses always rotate in the same direction and by equal amounts. This may be implemented by gear assemblies such as shown in FIGS. 10, 11, and 12. In FIGS. 8 and 12, knob 84 is affixed to an axial shaft, illustrated by line 121 in FIG. 12, to which front coupling gear 126 is also affixed so that the front coupling gear 126 and knob 84 will always turn in the same direction, whether clockwise or counter clockwise. Crown bevel gear assembly 122 and rear coupling gear 127 are not affixed to the axial shaft and therefore are able to freely rotate thereon. Gears 123 and 124 within the crown bevel gear assembly 122 mate with the inner circular bevel gearings 125a and 125b of rear coupling gear 127 and front coupling gear 126 respectively. The gearings 125a and 125b form with crown bevel gears 123 and 124 a combination gear assembly wherein crown bevel gear assembly 122 and rear coupling gear 127 will rotate in the same direction as the front coupling gear 126 and knob 84 when detent 86 is positioned so that roller pinion 87 engages the outer peripheral gears of the crown bevel gear assembly 122 and coupling gears 126, 127, and the rear coupling gear 127 will rotate in an opposite direction to the front coupling gear 126 and knob 84 when detent 86 is positioned so that pawl 88 engages the outer peripheral gearing of the crown bevel gear assembly 122, thereby preventing its rotation. Since front coupling gear 126 mates with and causes the front prisms to rotate and since rear coupling gear 127 mates with and causes the rear prisms to rotate, it can easily be seen that both front and rear prisms will rotate in the same clockwise or counterclockwise direction as the knob 84 when the detent is positioned so that roller pinion is engaged and that the front and rear prisms will rotate in opposite directions resulting in the right and left eye front prisms rotating in clockwise or counterclockwise directions as the knob 84, and the right and left eye rear prisms rotating in clockwise and counterclockwise directions opposite to that of knob 84 when the detent is positioned so that the pawl is engaged. FIGS. 13 and 14 illustrates a second novel means for adjusting the viewing prisms by using a continuous pulley cord which is wrapped around each of the prism or lens mounts and knobs.

At the beginning of each video tape it is advisable to display the recorded alignment pattern to enable each individual viewer to align the lenses or prisms in the eyeglasses for the selected distance of viewing, as well as, screen size. The test patterns are shown in FIGS. 15, 16 and 17. The test patterns as partially aligned are shown in FIG. 16, and as correctly aligned in FIG. 17. Prior art techniques usually employ identical patterns in each of the upper and lower images of the stereo pair. Applicant3 s employment of dissimilar patterns overcomes the natural tendency of the human brain to converge similar patterns by muscular movement of the eye, thereby resulting over a period of time in straining the eyes. Said dissimilar test patterns can be dissimilar in shapes, colors, sizes, spacing and timing.

It is very important in the preparation of stereo images that adjustments can be made to maintain center to center distance of the left and right eye images. Inherent in video camera systems are changes in image sizes and monitoring means 15 is required to resolve this problem by generating additional signals for superimposition to the video signal from the video camera prior to display on a Cathode Ray Tube. Any changes in the image size caused by non-linearity of the display will equally change the size and position of the electronic additional signal. Applicant's inventive method for providing means for adding signals to video signals is equally applicable to stereo image pairs created by a live television camera with a stereo adapter as well as images which are being transferred from motion picture film or other media to videotape.

Figure 18A:
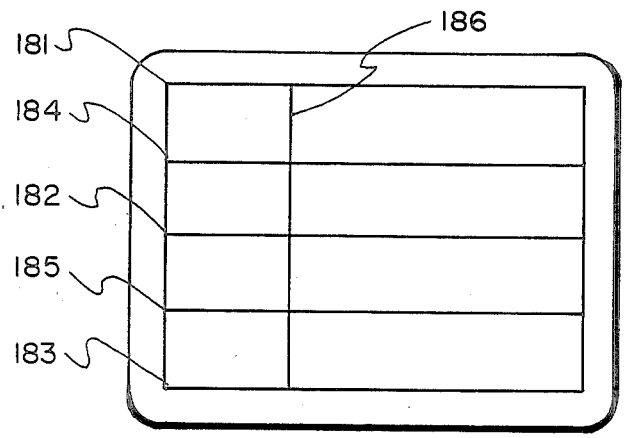
FIG. 18a is a front view of a Cathode Ray Tube illustrating means for monitoring any changes in size of the stereo image pair resulting from the non-linearity of the television display.
Figure 18B:
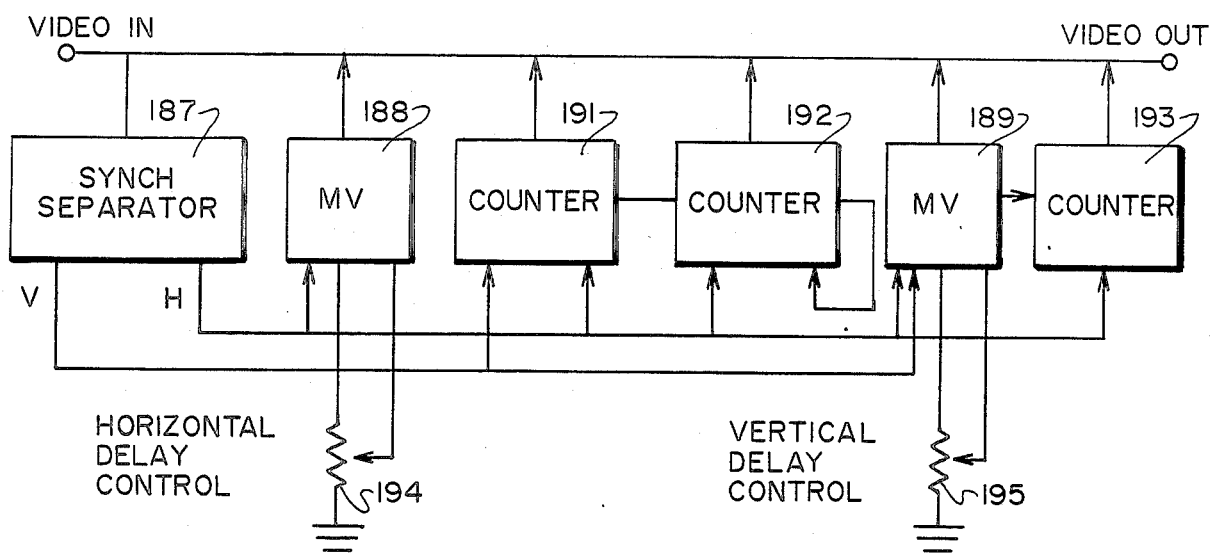
FIG. 18b is a block diagram of the circuits employed for monitoring any non-linearity of the display shown in FIG. 18b.

Referring to FIGS. 18a and 18b, line 181 is the top border of the of the upper subimage; line 182 is the center of the upper subimage and the division line between upper and lower subimages of the stereo pair; and line 183 is the bottom border of the lower subimage. Lines 184 and 184 are the cursors which may be displaced vertically in order to position the cursors, which are always displaced by exactly the same number of scan lines, over a desired element of the picture in the subimage. Line 186 is the cursor which may be displaced horizontally in order to position the cursor over a desired element of the picture in the images. FIG. 18b is a block diagram of one means for implementing the addition of a video signal to the input video signal by supplying the input video signal to synchronous separator 187 to generate horizontal (H) and vertical (V) pulses; the horizontal pulses being supplied to monostable multivibrators 188, 189 and counters 191, 192 and 193, the vertical pulses being supplied to counter 191 and monostable multivibrator 189. Counter 191 counts sixteen pulses before generating a long pulse and counters 192 and 193 counts one hundred and twenty-one pulses before generating a long pulse. Operation of monostable multivibrator 188 is initiated by the horizontal pulse (H) to generate a pulse every scan line, the delay time of which is controlled by potentiometer 194, thereby resulting by the addition of the horizontal pulse to the video signal of horizontal cursor 186 as shown in FIG. 18a. Counter 191, reset by the vertical pulse (V), counts sixteen horizontal pulses and then produces a long pulse which is added to the video signal resulting in the superimposition of the top border line 181 as shown in FIG. 18a. Counter 192 is reset either by the output of counter 191 or its own output, and which after it is reset count 121 scan lines, after which it generates a long pulse which is added to the video signal resulting in the superimposition of center line 182 and subsequently after another 121 scan lines bottom line border 183 as shown in FIG. 18a. Monostable multivibrator 189 is reset by the vertical and horizontal pulses to produce a pulse the delay time of which is controlled by potentiometer 195, thereby resulting in the addition to the video signal of upper vertical position reference cursor 184 as shown in FIG. 18a. Counter 193, reset by the output of monostable multivibrator 189, which after it is reset counts 121 pulses produces a long pulse that is added to the video signal resulting in the superposition of lower vertical position reference cursor 185 as shown in FIG. 18a. It is noted that the foregoing dscription of the invention is as required for full frame utilization of NTSC standard television having 525 lines. Other circuits can be made for other television standards having other numbers of scan lines and for utilization of less than the full available picture area.

Since a moving picture is nothing more than a number of pictures in sequence, the application of applicant's inventive apparatus and process for the viewing of three-dimensional television is obvious in view of applicant's invention. This invention teaches new apparatus and processes for stereoscopic convergence. Viewing of stereo pictures that is compatible with existing image distribution systems comprising still and moving photography, printing, television, art and computer graphics.

It is expected that although only a few embodiments of applicant's inventive apparatus and processes have been disclosed, applicant's invention will not be so limited but will be limited by the breadth and width of the annexed claims.

I claim:

1. An stereoscopic imaging process comprising receiving stereo images, modifying said stereo images for any scope aspect ratio, recording said modified stereo images on a visual media with chromatic aberration, transmitting said modified stereo image pairs to a image viewing device and independently viewing said stereo images through viewing means having chromatic aberration complementary to the chromatic aberration misregistration recorded on said visual media so that the left and right eyes view said images with depth.

2. A stereoscopic imaging system as claimed in claim 1 wherein said stereo images comprising first and second subfields are positioned in an over and under format respectively.

3. A stereoscopic imaging system as claimed in claim 1 wherein said stereo images comprising first and second subfields are positioned in a side by side format respectively.

4. A stereoscopic imaging system as claimed in claim 1 wherein said means for introducing misregistration of images into said recording means comprises adjustment in the registration of the camera tube of the recording means.

5. A stereoscopic imaging system as claimed in claim 1 wherein said means for introducing misregistration of images into said recording means comprises repositioning of the components of the images.

6. A stereoscopic imaging system as claimed in claim 5 wherein repositioning of the components of the images comprises electronic storage of the components.

7. A stereoscopic imaging system as claimed in claim 5 wherein repositioning of the components of the images comprises readjustment of the Cathode Ray Tube.

8. A stereoscopic imaging system as claimed in claim 1 wherein said viewing means comprises adjustable glasses having two double pairs of noncolor corrected prisms in an eyeglass frame, each of said double pair of prisms having rotational means for equally rotating in the same rotational direction at 180 degree displacement from each other and equally rotating the front and rear prism of said double pair in the same direction.

9. A stereoscopic imaging system as claimed in claim 1 wherein said optical means comprises two double pairs of noncolor corrected lenses in an eyeglass frame, each of said double pair of lenses having rotational means for rotating equally in the same rotational direction at 180 degrees displacement from each other and equally rotating the front and rear prism of said double pair in opposite directions.

10. A stereoscopic imaging process as claimed in claim 1 further comprising means for superimposing additional signals on said video signals for maintaining center to center distances of the left and right stereo images.

11. A stereoscopic imaging process as claimed in claim 10 further comprising adjustment means comprising dissimilar test patterns.

12. A stereoscopic imaging process as claimed in claim 11 wherein said dissimilar test patterns comprise dissimilar shapes.

13. A stereoscopic imaging process as claimed in claim 11 wherein said dissimilar test patterns comprise dissimilar colors.

14. A stereoscopic imaging process as claimed in claim 11 wherein said dissimilar test patterns comprise dissimilar timing.

15. A stereoscopic imaging process as claimed in claim 11 wherein said dissimilar test patterns comprises dissimilar spacing.

16. A stereoscopic imaging process as claimed in claim 11 wherein said dissimilar test patterns comprise dissimilar sizes.

17. A three dimensional television system comprising means for receiving video signals, means for modifying the aspect ratio of the video images, means for forming said video images into stereo image pairs, means for recording said stereo pairs on a video tape with chromatic aberration misregistration, means for playing said tape having said stereo image pairs sequentially for display on a television tube with incomplete images.

18. A three dimensional television system as claimed in claim 17 wherein said recording of stereo image pairs modified to any scope aspect ratio is through mechanical means.

19. A three dimensional television system as claimed in claim 17 wherein said recording of stereo image pairs modified to any scope aspect ratio is through optical means.

20. A three dimensional television system as claimed in claim 17 wherein said recording of stereo image pairs modified to any scope aspect ratio on a video tape is through electronic means.

21. Stereoscopic apparatus comprising eyeglass frames and front and rear optical means positioned within the frame for each eye, the frame for each eye having means for equally rotating said front and rear optical means in the same direction at 180 degree displacement from each other and alternate means for equally rotating the front and rear optical means either in the same direction or in opposite directions.

22. Stereoscopic apparatus as claimed in claim 21 wherein said optical means comprises prisms.

23. Stereoscopic apparatus as claimed in claim 21 wherein said optical means comprises lenses.

24. Stereoscopic apparatus as claimed in claim 21 wherein said rotational means comprises gear mounts within which said optical means are positioned.

25. Stereoscopic apparatus as claimed in claim 21 wherein said rotational means comprises gearing incorporated within said optical means.

26. Stereoscopic apparatus as claimed in claim 21 wherein said rotational means comprises belting incorporated within said optical means.

* * * * *